(12) United States Patent
Selwa et al.

(10) Patent No.: US 10,845,824 B2
(45) Date of Patent: *Nov. 24, 2020

(54) SUPPLEMENTAL ATTITUDE WITH ENGAGED AND DISENGAGED INPUT DEVICE MODES

(71) Applicant: Kitty Hawk Corporation, Mountain View, CA (US)

(72) Inventors: Alexander David Selwa, Mountain View, CA (US); Mark Johnson Cutler, Sunnyvale, CA (US)

(73) Assignee: Kitty Hawk Corporation, Palo Alto, CA (US)

(*) Notice: Subject to any disclaimer, the term of this patent is extended or adjusted under 35 U.S.C. 154(b) by 155 days.

This patent is subject to a terminal disclaimer.

(21) Appl. No.: 16/107,833

(22) Filed: Aug. 21, 2018

(65) Prior Publication Data

US 2019/0171234 A1 Jun. 6, 2019

Related U.S. Application Data

(63) Continuation of application No. 15/830,253, filed on Dec. 4, 2017, now Pat. No. 10,082,801.

(51) Int. Cl.
| | |
|---|---|
| *G05D 1/08* | (2006.01) |
| *B64C 17/00* | (2006.01) |
| *B64C 19/00* | (2006.01) |
| *B64C 29/00* | (2006.01) |
| *B64C 15/02* | (2006.01) |
| *B64C 13/18* | (2006.01) |
| *B64C 27/20* | (2006.01) |
| *B64C 27/57* | (2006.01) |
| *G05D 1/00* | (2006.01) |
| *B64C 13/04* | (2006.01) |

(52) U.S. Cl.
CPC ....... *G05D 1/0816* (2013.01); *B64C 13/0421* (2018.01); *B64C 13/18* (2013.01); *B64C 15/02* (2013.01); *B64C 17/00* (2013.01); *B64C 19/00* (2013.01); *B64C 27/20* (2013.01); *B64C 27/57* (2013.01); *B64C 29/0091* (2013.01); *G05D 1/0011* (2013.01); *G05D 1/0858* (2013.01); *B64C 2201/146* (2013.01)

(58) Field of Classification Search
CPC .. G05D 1/0816; G05D 1/0858; G05D 1/0011; B64C 15/02; B64C 13/18; B64C 27/20; B64C 27/57; B64C 13/0421; B64C 19/00; B64C 17/00; B64C 29/0091; B64C 2201/146

See application file for complete search history.

(56) References Cited

U.S. PATENT DOCUMENTS

| | | | |
|---|---|---|---|
| 6,092,919 A * | 7/2000 | Calise | G05D 1/0825 244/194 |
| 2014/0267805 A1* | 9/2014 | Webb | H04N 5/23258 348/208.2 |
| 2017/0364067 A1* | 12/2017 | Burch | G05D 1/0022 |

* cited by examiner

*Primary Examiner* — Nga X Nguyen
(74) *Attorney, Agent, or Firm* — Van Pelt, Yi & James LLP

(57) ABSTRACT

An input attitude associated with an input device of an aircraft is received. A supplemental attitude is generated, including by selecting a position-based supplemental attitude to be the supplemental attitude in the event the input device is in a disengaged state and selecting a velocity-based supplemental attitude to be the supplemental attitude in the event the input device is in an engaged state. The input attitude and the supplemental attitude are combined in order to obtain a combined attitude. The aircraft is controlled using the combined attitude.

19 Claims, 9 Drawing Sheets

SUPPLEMENTAL ATTITUDE WITH ENGAGED AND DISENGAGED INPUT DEVICE MODES

CROSS REFERENCE TO OTHER APPLICATIONS

This application is a continuation of U.S. patent application Ser. No. 15/830,253, now U.S. Pat. No. 10,082,801, entitled SUPPLEMENTAL ATTITUDE WITH ENGAGED AND DISENGAGED INPUT DEVICE MODES filed Dec. 4, 2017 which is incorporated herein by reference for all purposes.

BACKGROUND OF THE INVENTION

As their name implies, ultralights are a category of aircraft that is very lightweight (e.g., 1200-1300 pounds). These aircraft are more susceptible to external forces which cause the aircraft to drift, both when the aircraft is flying forwards and when the aircraft is hovering midair. For example, wind and/or noise in the sensors may cause the aircraft to drift. New techniques to address drift would be desirable.

BRIEF DESCRIPTION OF THE DRAWINGS

Various embodiments of the invention are disclosed in the following detailed description and the accompanying drawings.

FIG. 4A is a diagram illustrating an embodiment of drift which is perpendicular to the direction of motion and which the velocity-based supplemental attitude compensates for.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to fly an aircraft using both input from an input device (e.g., a joystick) and a supplemental signal are described herein. In some embodiments, this is achieved by receiving an input attitude associated with an input device of an aircraft. A supplemental attitude is generated, including by selecting a position-based supplemental attitude to be the supplemental attitude in the event the input device is disengaged and selecting a velocity-based supplemental attitude to be the supplemental attitude in the event the input device is engaged. The input attitude and the supplemental attitude are combined in order to obtain a combined attitude and the aircraft is controlled using the combined attitude. The following figure describes this example process in more detail.

Figure 1:
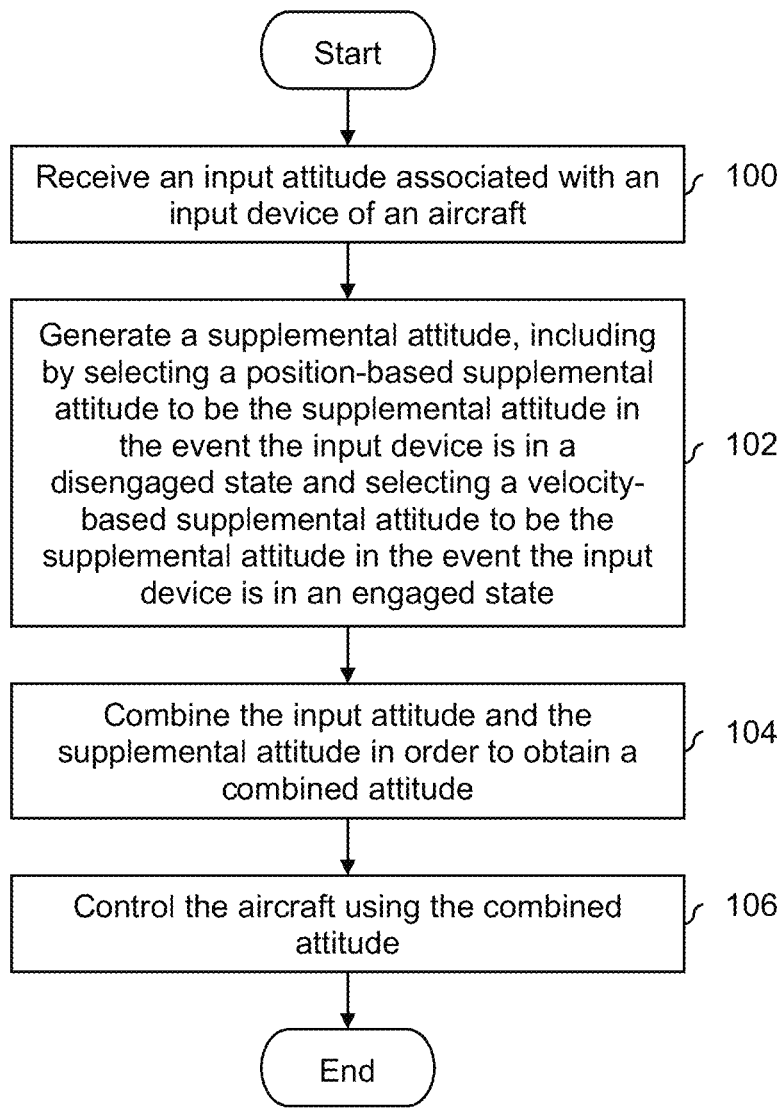
FIG. 1 is a flowchart illustrating an embodiment of a process to control an aircraft using a supplemental attitude with engaged and disengaged input device modes.

FIG. 1 is a flowchart illustrating an embodiment of a process to control an aircraft using a supplemental attitude with engaged and disengaged input device modes. In some embodiments, the process is performed by one or more components which sit between an input device (e.g., a joystick) and the control surfaces of an aircraft (e.g., the rotors of a multicopter); such component(s) may sometimes be referred to as a control path or a flight computer. A block diagram of one such exemplary system is described in more detail below.

At 100, an input attitude associated with an input device of an aircraft is received. In examples described herein, the various attitudes include roll angle, pitch angle, and yaw angle. The input attitude (e.g., which includes an input device roll angle, an input device pitch angle, and input device yaw angle) is referred to as such because it is the attitude which is specified by or otherwise based on the position of the input device. For example, if the input device is a joystick then the position of the joystick controls the input attitude.

At 102, a supplemental attitude is generated, including by selecting a position-based supplemental attitude to be the supplemental attitude in the event the input device is in a disengaged state and selecting a velocity-based supplemental attitude to be the supplemental attitude in the event the input device is in an engaged state. The supplemental attitude is an attitude and therefore includes a supplemental roll angle, a supplemental pitch angle, and a supplement yaw angle. This attitude supplements the input attitude (e.g., because the two are added together) and is therefore referred to as the supplemental attitude.

The supplemental attitude is based on and/or selected depending upon the state of the input device. For example, if the input device is a joystick and the pilot moves the joystick out of the spring-centered position, then the joystick is considered to be engaged. If the pilot is not touching the joystick or is only lightly holding the joystick such that the joystick is in the spring-centered position, then the joystick is considered to be disengaged. If the joystick (or, more generally, the input device) is engaged, then the velocity-based supplemental attitude is used as the supplemental attitude. Otherwise (i.e., the input device is disengaged), the position-based supplemental attitude is used as the supplemental attitude.

Generally speaking, the position-based supplemental attitude is referred to as such because it is based at least in part on the position of the aircraft (e.g., measured using GPS or some other sensor). Other, higher-order moments or time-based derivatives may (e.g., in addition to position) be used to determine the position-based supplemental attitude (e.g., velocity ($\dot{x}$), acceleration ($\ddot{x}$), and so on, for example measured using GPS and an accelerometer, respectively).

Similarly, the velocity-based supplemental attitude is referred to as such because it is based on the velocity of the aircraft. It is noted that other, higher-order moments or time-based derivatives may be used to determine the velocity-based supplemental attitude but lower-order moments or time-based derivatives (e.g., deriving from position) are not permitted to be used. For example, the velocity-based supplemental attitude may be generated based on (e.g., measured) acceleration ($\ddot{x}$) in addition to the (e.g., measured) velocity ($\dot{x}$) and so on and without taking into consideration (e.g., measured) position (x). For example, in experiments where position is used to generate the (velocity-based) supplemental attitude when the aircraft is in motion (e.g., which generally corresponds to when the input device is engaged), the resulting responsiveness of the aircraft is not as satisfying to the pilot as when the (velocity-based) supplemental attitude is not based on position (e.g., at least while the aircraft is in motion).

To put the above example in table form:

TABLE 1

Example Inputs for Position-Based Supplemental Attitude and Velocity-Based Supplemental Attitude

|  | Position-based supplemental attitude | Velocity-based supplemental attitude |
| --- | --- | --- |
| Based on position (x)? | Yes | No |
| Based on velocity ($\dot{x}$)? | Yes | Yes |
| Based on acceleration ($\ddot{x}$)? | Yes | Yes |
| Based on jerk $\dddot{x}$? | Yes | Yes |
| Based on snap? | Yes | Yes |

At 104, the input attitude and the supplemental attitude are combined in order to obtain a combined attitude. For example, the roll angles from the input attitude and the supplemental attitude may be summed, the pitch angles from the input attitude and the supplemental attitude may be summed, and so on.

At 106, the aircraft is controlled using the combined attitude. For example, as is described in more detail below, the combined attitude may be passed to an attitude controller which inputs a (e.g., desired) attitude and outputs one or more control signals to the various control surfaces of the aircraft. For example, for a multicopter (where the rotors are mounted to the aircraft at a fixed position or angle), an attitude controller would output controls signals which would independently spin up/down the rotors appropriately.

By using the combined attitude to fly the aircraft, the aircraft is able to better respond to the pilot's inputs (e.g., via the input device), for example in a manner that more closely resembles a perfect response where there are perfect sensors (e.g., a gyroscope, accelerometer, or GPS which measures aircraft state information, including position, velocity, acceleration, attitude, etc.) which perfectly measure the aircraft's state information and no external forces acting on the aircraft (e.g., wind). More generally, these sources of errors and/or noise (e.g., sensor noise, wind, etc.) are referred to as drift.

In one example, suppose the aircraft is hovering midair. If there is no drift (e.g., sensors are working perfectly, there is no wind, etc.), then the supplemental attitude will be zero. However, if there is drift (e.g., from sensor noise and/or errors, wind, etc.), then the supplemental attitude will be non-zero in order to bring the aircraft to a stop.

Similarly, if the aircraft is flying along at a non-zero velocity, the supplemental attitude will be zero if there is no drift. If there is some drift (e.g., due to wind, noise, or errors in the sensors, etc.), then the supplemental attitude will act to counter the drift so that the aircraft flies in a manner that more closely resembles the pilot's input via the input device. In some embodiments, the supplemental attitude only attempts to correct drift (e.g., while the aircraft is moving) which is perpendicular to the aircraft's direction of motion (e.g., the direction of the velocity vector). For example, a pilot may not necessarily care if headwinds or tailwinds cause the aircraft to slow down or speed up, but crosswinds which cause the aircraft to drift sideways or laterally (e.g., relative to the direction of movement) may be unnerving and the supplemental attitude in some embodiments corrects for drift perpendicular to the direction of motion and ignores drift parallel to the direction of motion.

It may be helpful to describe a block diagram of a system which performs the steps described in FIG. 1. The following figure shows one such example.

Figure 2:
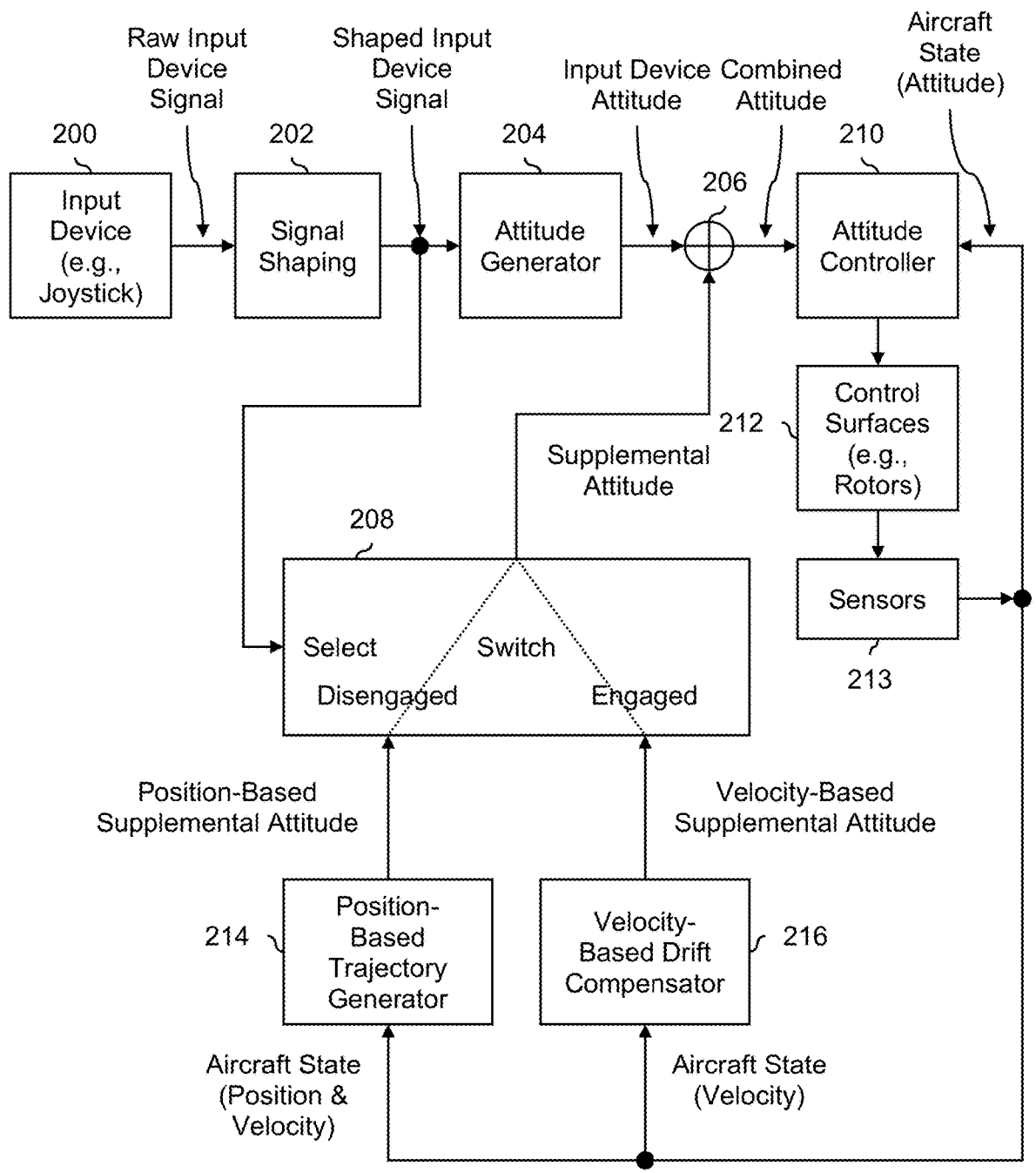
FIG. 2 is a diagram illustrating a block diagram of an aircraft's control path which selects a supplemental attitude based on whether the input device is in an engaged state or disengaged state.

FIG. 2 is a diagram illustrating a block diagram of an aircraft's control path which selects a supplemental attitude based on whether the input device is in an engaged state or disengaged state. In this example, the pilot uses an input device (200), such as a joystick, to maneuver the aircraft. The input device (200) outputs a raw input device signal indicating the position of the joystick, for example, a displacement relative to some spring-centered position. In this example, the input device is a spring-centered joystick where springs cause the joystick to return to a centered position if the pilot releases the joystick.

The signal shaping block (202) inputs the raw input device signal and outputs a shaped input device signal (e.g., the position of the joystick after any shaping is applied) according to some set of shaping rules. For example, one rule might be to smooth out any sudden changes in the raw input device signal. Suppose that the pilot was not touching the joystick (so the joystick was in the spring-centered position) and then suddenly pushed the joystick all the way forward by accident. The raw input device signal would resemble a step function but the shaped input device signal would change more slowly than the raw input device signal. This is useful in preventing a sudden acceleration of the aircraft which could be dangerous. This is merely one signal shaping example and any type of signal shaping rule may be applied.

The shaped input device signal is passed from the signal shaping block (202) to the attitude generator (204) which outputs an input device attitude. As described above, the input device attitude may include an input device roll angle, an input device pitch angle, an input device yaw angle, angles, rates, angular acceleration, etc. Returning briefly to FIG. 1, the input attitude which is output by the attitude generator (204) is one example of the input attitude received at step 100 in FIG. 1.

The switch (208) selects which source to use as the supplemental attitude depending upon the state of the input device. If the input device (200) is disengaged, then the switch (208) selects the position-based supplemental attitude output by the position-based trajectory generator (214) to be the supplemental attitude. If the input device (200) is engaged, then the switch (208) selects the velocity-based supplemental attitude output by the velocity-based drift compensator (216) to be the supplemental attitude. It is noted that the position-based trajectory generator bases its supplemental attitude on both position and velocity but the velocity-based drift compensator only inputs velocity and not position. The processing performed by these blocks is described in more detail below.

In one simplistic example, if the joystick is in the spring-centered position (e.g., indicated by the shaped input device signal), then the joystick is considered to be in the disengaged state. If the joystick is not in the spring-centered position, then the joystick is considered to be in the engaged state. A more sophisticated example is described below where hysteresis is used to avoid rapid switching between the engaged and disengaged states when the input device is just on the threshold between the engaged state and the disengaged state.

Returning briefly to FIG. 1, position-based trajectory generator 214, velocity-based drift compensator 216, and switch 208 show an example of components which perform step 102 in FIG. 1.

An adder (206) sums the input attitude with the supplemental attitude in order to produce a combined attitude. Returning briefly to FIG. 1, the adder (206) is one example of a component which performs the combining at step 104 in FIG. 1.

The combined attitude is passed to an attitude controller (210) which outputs one or more control signals for the control surfaces (212) of the aircraft. For example, in the case of a multicopter, the only control surfaces are the rotors which can be independently spun up/down and the attitude controller outputs control signals for each of the rotors (e.g., 10 control signals if there are 10 rotors). Returning briefly to FIG. 1, attitude controller 210 is one example of a component which performs step 106 in FIG. 1 (e.g., where an aircraft is controlled using the combined attitude).

The adjustments to the control surfaces (212) cause the aircraft to change states (e.g., the aircraft's position, velocity changes, acceleration, and/or attitude change) which are measured by sensors 213. Any appropriate set of sensors may be used, including (but not limited to) GPS, gyroscopes, accelerometers, radar, etc. The sensors (213) output the (e.g., new or updated) aircraft state information which includes the aircraft's new position, new velocity, new attitude, etc.

In this example, different blocks input or otherwise digest different pieces of aircraft state information. For example, the attitude controller (210) inputs the (e.g., measured) attitude information in the aircraft state information. The attitude controller compares the measured attitude information against the desired attitude (e.g., the combined attitude output by adder 206) and adjusts the control signals which are output accordingly (e.g., using a feedback loop).

In this example, attitude controller 210 (e.g., which inputs a desired attitude from adder 206) is very robust against failures or errors. In contrast, some other controllers (e.g., which input desired positions and/or desired velocities) are not as robust as attitude controller 210. For this reason, the process of FIG. 1 recites various types of attitudes (e.g., input attitude, supplemental attitude, combined attitude, etc.) as opposed to positions, velocities, etc.

In some embodiments, as a failsafe, the supplemental attitude can be zeroed out or otherwise ignored by the adder so that the aircraft can be flown using just the input attitude. This permits the aircraft to fly even if any of the blocks associated with generating the supplemental attitude (e.g., position-based trajectory generator 214, velocity-based drift compensator 216, and/or switch 208) fail. In some embodiments, this is done by detecting a failure in the sensor(s) based on a confidence level. For example, if the estimated aircraft position and velocity have a large enough uncertainty there is less confidence in their accuracy, and at some threshold(s) are ignored. In some embodiments, the aircraft provides a switch and/or a button (e.g., a physical/dedicated one or a virtual one in a user interface/display) that allows the pilot to ignore the supplemental attitude in the event the vehicle is behaving undesirably.

The following figures describe an example of this.

Figure 3A:
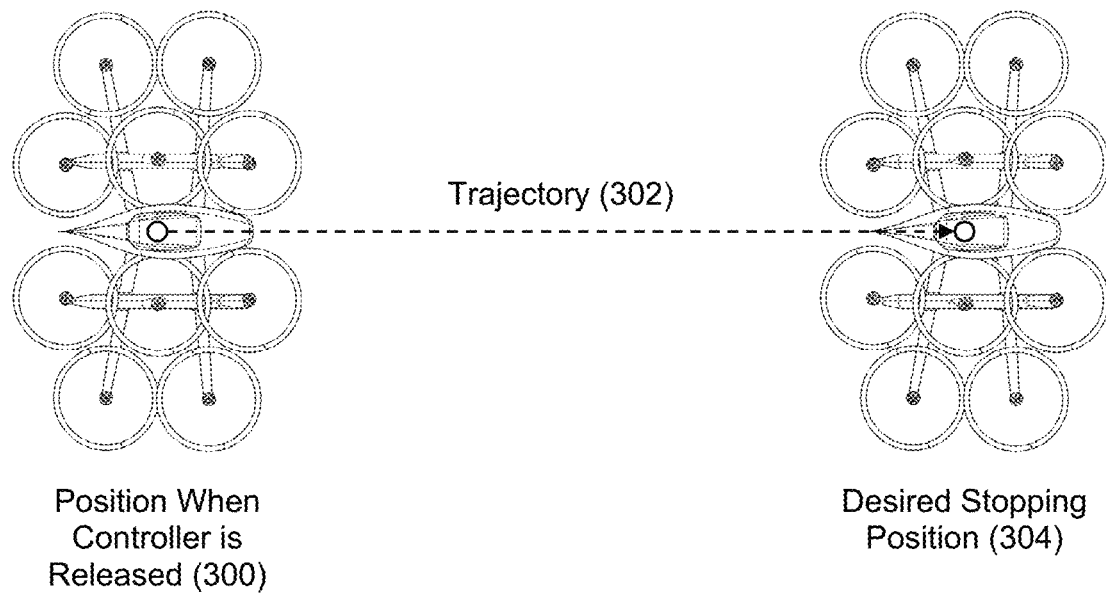
FIG. 3A is a diagram illustrating an embodiment of a position-based supplemental attitude when a pilot initially lets go of an input device and the input device transitions from an engaged state to a disengaged state.

FIG. 3A is a diagram illustrating an embodiment of a position-based supplemental attitude when a pilot initially lets go of an input device and the input device transitions from an engaged state to a disengaged state. In the example shown, a top view of a multicopter is shown. At position 300, the multicopter is flying along when the pilot releases the input device. The position-based trajectory generator (block 214 in FIG. 2) plots a trajectory (302) to a desired stopping position (304). The desired stopping position and/or trajectory is selected or otherwise determined using one or more restrictions (e.g., on position, velocity, acceleration, jerk, attitude, etc.) which ensure that the aircraft comes to a stop smoothly. In FIG. 2, the position-based trajectory generator (214) outputs a position-based supplemental attitude which corresponds to the trajectory and/or stopping position shown here when the pilot initially releases the input device.

Figure 3B:
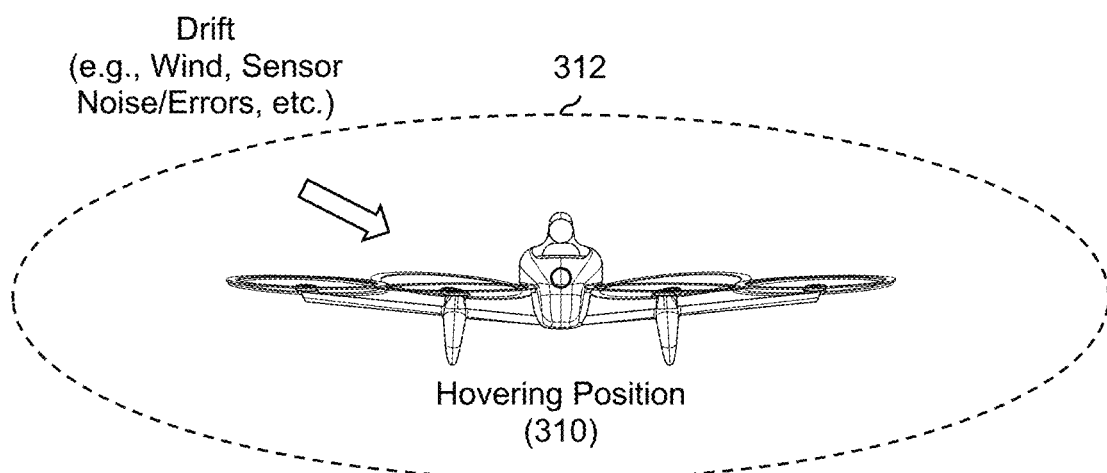
FIG. 3B is a diagram illustrating an embodiment of a position-based supplemental attitude while an input device is in a disengaged state and the aircraft is hovering midair.

FIG. 3B is a diagram illustrating an embodiment of a position-based supplemental attitude while an input device is in a disengaged state and the aircraft is hovering midair. In this example, a front view of the multicopter is shown and in this state the multicopter is hovering midair at position 310. For example, once the aircraft has come to a stop per the example of FIG. 3A, the multicopter will be in the position (310) shown. Once in hovering position 310, the aircraft may drift slightly due to wind and/or sensor noise or errors. The supplemental attitude is used to keep the aircraft stationary in its hovering position, for example at the center of ellipsoid 312. It is noted that it is easier to maintain vertical position as opposed to lateral position and that is why an ellipsoid is shown instead of a sphere. The ellipsoid (312) represents the volume within which the system (e.g., using the input attitude in combination with the position-based supplemental attitude) is able to maintain while hovering midair. In some embodiments, if the aircraft leaves ellipsoid 312 (e.g., because of very large wind gusts and/or large errors or noise in the sensors), the aircraft will attempt to land automatically. The general principle is the same in FIG. 3A as in FIG. 3B although the magnitude of the position-based supplemental attitude is expected to be larger in FIG. 3A since a larger stopping force is expected.

In one example, the position-based supplemental attitude (PBSA), for example which is output by position-based trajectory generator 214 in FIG. 2, is obtained using:

$$\text{PBSA} = K_p(x_d(t) - \hat{x}_d(t)) + K_d(\dot{x}_d(t) - \hat{\dot{x}}_d(t)) + K_i \int (x_d(t) - \hat{x}_d(t)) dt \quad (1)$$

where $K_p$ is a proportional gain,
$x_d(t)$ is the desired position as a function of time,
$\hat{x}_d(t)$ is the measured position as a function of time,
$K_d$ is a derivative gain,
$\dot{x}_d(t)$ is the desired velocity as a function of time,
$\hat{\dot{x}}_d(t)$ is the measured velocity as a function of time, and
$K_i$ is a integral gain.

In a perfect system with no drift, $x_d(t) = \hat{x}_d(t)$ and $\dot{x}_d(t) = \hat{\dot{x}}_d(t)$ and the resulting position-based supplemental attitude will equal zero. If either equality does not hold, then the resulting position-based supplemental attitude will be non-zero.

In some embodiments, position-based trajectory generator 214 in FIG. 2 continuously generates position-based supplemental attitudes which would cause the multicopter (or, more generally, aircraft) to come to a stop at any given time given the aircraft's current state information. For example, since it is not known when the pilot will release the input device (e.g., when the aircraft is in motion) and it is not known when drift will occur (e.g., when the aircraft is hovering midair), it may be desirable to have a position-based supplemental attitude ready at any time.

Returning briefly to FIG. 2, velocity-based drift compensator 216 uses the (e.g., measured) velocity from the sensors (213) to generate the velocity-based supplemental attitude while not taking the aircraft's position into account. The following figure shows an example of how the velocity-based supplemental attitude is determined.

Figure 4A:
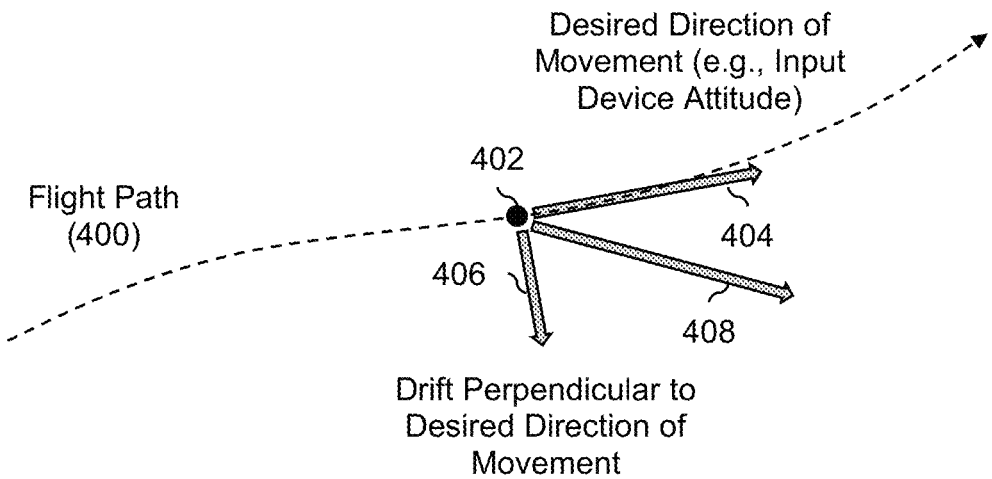

FIG. 4A is a diagram illustrating an embodiment of drift which is perpendicular to the direction of motion and which the velocity-based supplemental attitude compensates for. In this example, the top view of a flight path (400) of an aircraft is shown. At position 402 (e.g., while the input device remains in the engaged state), the aircraft has a desired direction of movement (404). For example, in FIG. 2, the desired direction of movement may correspond to the input device attitude which is output by attitude generator 204.

For simplicity and ease of explanation, in this example, all of the drift (406) is perpendicular to the desired direction of movement (404). For example, there may be a crosswind which is pushing the aircraft sideways or sensor noise and/or errors which manifest themselves solely in this direction. The desired direction of movement (e.g., corresponding to the input attitude) combined with the perpendicular drift (406) produces a measured direction of movement (408) which is different from the desired direction of movement. For example, in FIG. 2, the measured direction of movement may correspond to the measured attitude or measured velocity which is output by sensors 213.

The velocity-based drift compensator (e.g., 216 in FIG. 2) produces a velocity-based supplemental attitude which compensates for directional changes in the desired direction of movement due to perpendicular drift. So, in this example, the velocity-based supplemental attitude (not shown) would compensate for all of the perpendicular drift 406 so that the measured direction of movement matches the desired direction of movement.

Figure 4B:
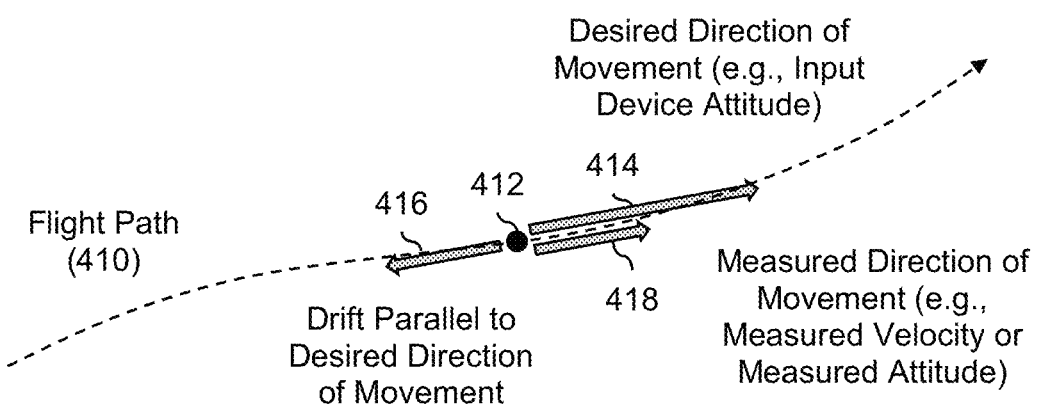
FIG. 4B is a diagram illustrating an embodiment of drift which is parallel to the direction of motion and which the velocity-based supplemental attitude ignores.

FIG. 4B is a diagram illustrating an embodiment of drift which is parallel to the direction of motion and which the velocity-based supplemental attitude ignores. As before, the aircraft is traveling along a flight path (410) which is shown from a top view here. At position 412, drift (416) occurs where the drift is parallel to the desired direction of movement. For example, the drift may be headwind. Arrow 414 shows the desired direction of movement (414) which when combined with the drift (416) produces a measured direction of movement (418). Since the drift is parallel to the desired direction of movement, the drift only slows the aircraft down, without causing any lateral or side-to-side drift. In this example, the velocity-based drift compensator will ignore the drift (e.g., because it is not causing lateral or side-to-side drift) and therefore the velocity-based supplemental attitude will be zero (e.g., because this is not a situation or scenario which the velocity-based drift compensator is designed to correct).

More formally, in this example, the velocity-based supplemental attitude (VBSA), for example, output by velocity-based drift compensator 216 in FIG. 2, is obtained using:

$$\text{VBSA} = K_d(f_p(\dot{x}_d(t) - \hat{\dot{x}}_d(t), \text{desired\_dir})) + K_i \int f_p(\dot{x}_d(t) - \hat{\dot{x}}_d(t), \text{desired\_dir}) dt \quad (2)$$

where $K_d$ is a derivative gain,
$f_p$ is a projection function with two inputs where the first input (e.g., $\dot{x}_d(t) - \hat{\dot{x}}_d(t)$) is projected perpendicular to the second input (e.g., desired_dir),
$\dot{x}_d(t)$ is the desired velocity as a function of time (e.g., obtained from the input attitude),
$\hat{\dot{x}}_d(t)$ is the measured velocity as a function of time (e.g., measured by the sensor(s)),
desired_dir is the desired direction of movement (e.g., obtained by and/or represented by the input attitude), and
$K_i$ is a integral gain.

For example, if $\dot{x}_d(t) - \hat{\dot{x}}_d(t)$ is completely parallel to the desired direction, then the projection function will output a zero value and the resulting velocity-based supplemental attitude will be zero (e.g., because there is nothing to correct). This corresponds to the example of FIG. 4B. In contrast, if there is some drift (e.g., $\dot{x}_d(t) - \hat{\dot{x}}_d(t)$) which is perpendicular to the desired direction then it would be retained or survive the projection function, producing a non-zero velocity-based supplemental attitude. See, for example, FIG. 4A.

In some embodiments, a velocity-based supplemental attitude corrects for a drift downwards or upwards (e.g., perpendicular to a desired direction of motion). For example, consider the front view shown in FIG. 3B and suppose that instead of hovering the aircraft was flying forwards. In some embodiments, a velocity-based supplemental attitude is produced which corrects for the downward-and-sideways drift.

This example is described more generally and/or formally in the next figure below.

Figure 5:
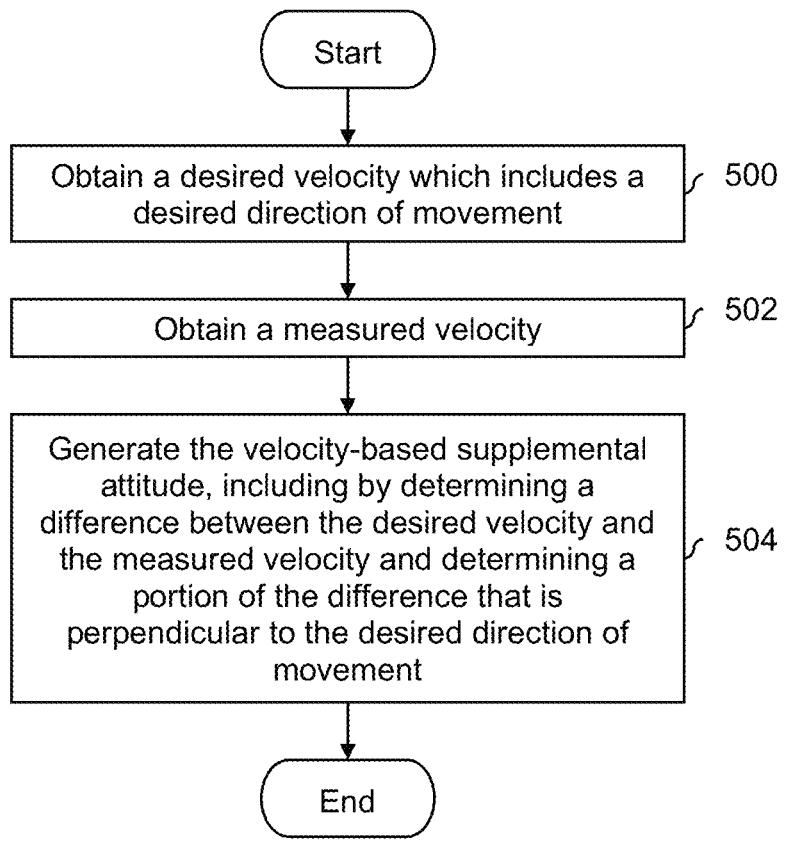
FIG. 5 is a flowchart illustrating an embodiment of a process to generate a velocity-based supplemental attitude.

FIG. 5 is a flowchart illustrating an embodiment of a process to generate a velocity-based supplemental attitude. In some embodiments, the process of FIG. 5 is performed in combination with the process of FIG. 1 (e.g., the process of FIG. 5 generates a velocity-based supplemental attitude which can be selected at step 102 in FIG. 1). In FIG. 2, velocity-based drift compensator 216 shows an example of a component or block which performs the process of FIG. 5.

At 500, a desired velocity which includes a desired direction of movement is obtained. For example, in Equation (2), $\dot{x}_d(t)$ is one example of a desired velocity where $\dot{x}_d(t)$ varies in magnitude and direction with time. In the example of FIG. 2, the desired velocity may be based on the input attitude which is output by the attitude generator (204).

At 502, a measured velocity is obtained. For example, in Equation (2), $\hat{\dot{x}}_d(t)$ is the measured velocity. In FIG. 2, the measured velocity is one of the pieces of aircraft state information which is output by sensors 213. Although not explicitly stated in step 502, since the measured velocity is a velocity, it also has a magnitude and direction.

At 504, the velocity-based supplemental attitude is generated, including by determining a difference between the desired velocity and the measured velocity and determining a portion of the difference that is perpendicular to the desired direction of movement. For example, in Equation (2), $(\dot{x}_d(t) - \hat{\dot{x}}_d(t))$ shows one example of determining a difference and $f_p(\dot{x}_d(t) - \hat{\dot{x}}(t), \text{desired\_dir})$ shows one example of determining a portion of the difference that is perpendicular to the desired direction of movement.

In some embodiments, hysteresis is used to detect what state (e.g., engaged or disengaged) an input device is in. The following figures show some examples of this.

Figure 6A:
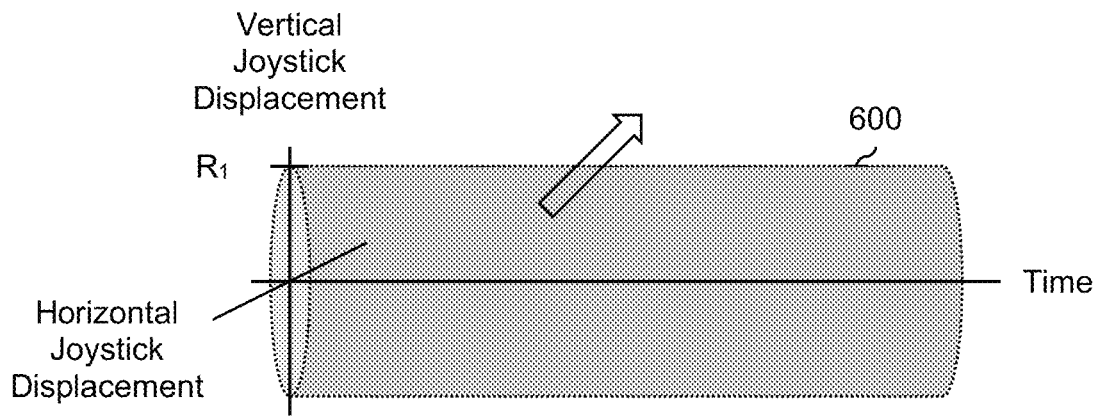
FIG. 6A is a diagram illustrating an embodiment of a first radial threshold associated with detecting the transition of an input device from a disengaged state to an engaged state.

FIG. 6A is a diagram illustrating an embodiment of a first radial threshold associated with detecting the transition of an input device from a disengaged state to an engaged state. In this example, the input device is a joystick but the technique may be applied to other types of input devices. A 3D graph is shown where the axes are time, the horizontal joystick displacement, and the vertical joystick displacement. For example, if the joystick is in the spring-centered position, then both the horizontal joystick displacement and vertical joystick displacement would be equal to zero.

The shaded cylinder (600) represents the radial threshold that is used to detect or identify a transition of the input device (in this example, a joystick) from the disengaged state to the engaged state. If the horizontal joystick displacement and the vertical joystick displacement produce a radial displacement (e.g., from the center) that is greater than the first radial threshold $R_1$ (e.g., represented by shaded cylinder 600), then it will be decided that the input device (in this example, a joystick) has switched from the disengaged state to an engaged state.

Returning briefly to FIG. 2, the shaped input device signal output by the signal shaping block (202) may be plotted in the graph shown here and anytime the shaped input device signal goes from the inside of the shaded cylinder (600) to the outside of the shaded cylinder (600), it would be decided that the input device is going from the disengaged state to the engaged state.

Figure 6B:
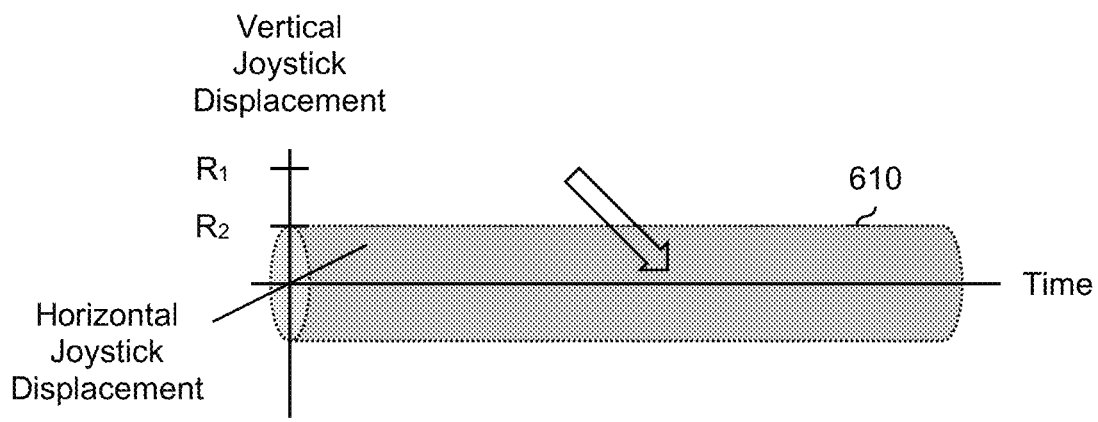
FIG. 6B is a diagram illustrating an embodiment of a second radial threshold associated with detecting the transition of an input device from an engaged state to a disengaged state.

FIG. 6B is a diagram illustrating an embodiment of a second radial threshold associated with detecting the transition of an input device from an engaged state to a disengaged state. In this example, the shaded cylinder (610) corresponds to the second radial threshold $R_2$ which is used to detect a transition from the engaged state to the disengaged state, where $R_2 < R_1$. As before, the shaped input device signal output by the signal shaping block (202) in FIG. 2 may be plotted in the graph shown here and anytime the shaped input device signal goes from the outside of the shaded cylinder (610) to the inside, it would be decided that the input device is going from the engaged state to the disengaged state.

Figure 6C:
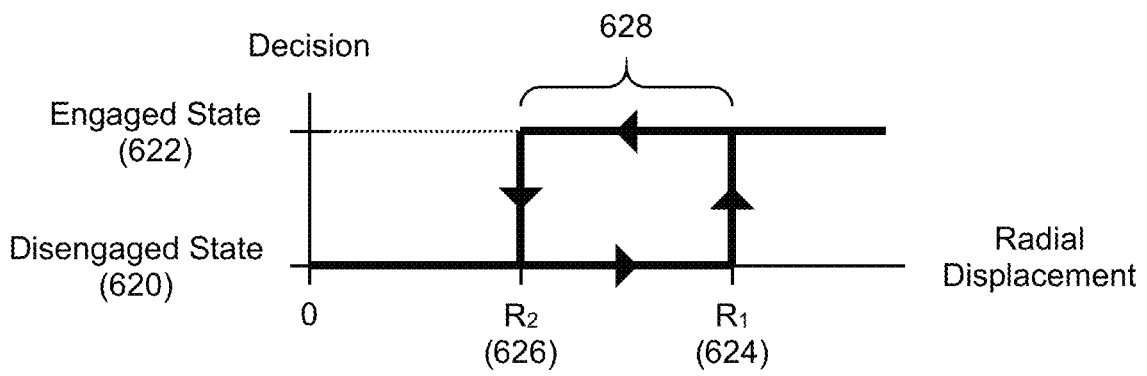
FIG. 6C is a diagram illustrating an embodiment of input device state detection which uses hysteresis.

FIG. 6C is a diagram illustrating an embodiment of input device state detection which uses hysteresis. In this example, the information shown in FIGS. 6A and 6B is shown in an alternate, 2D form. In this graph, the x-axis shows the radial displacement of the joystick and the y-axis shows the decision about what state the input device is in. To go from the disengaged state (620) to the engaged state (622), the radial displacement needs to exceed $R_1$ (624). To put it another way, when the radial displacement exceeds $R_1$, the input device is determined to be in the engaged state. To go from the engaged state (622) to the disengaged state (620), the radial displacement needs to be less than $R_2$ (626). In other words, when the radial displacement is less than $R_2$, the input device is determined to be in the disengaged state. In the region between $R_2$ and $R_1$ (628), the state or decision will be the same as the previous state or decision (i.e., there is no change in the decision or state).

Using hysteresis to detect which state the input device is in (as shown here) prevents frequent or excessive switching between the engaged state and the disengaged state, which in turn may cause jerky or abrupt changes in the supplemental attitude and thus in the combined attitude and subsequently the aircraft's response. For example, if a single threshold were instead used but the position of the joystick was very close to the threshold (such that there were many transitions back and forth across the threshold), there would be many transitions between the engaged state and the disengaged state, which is undesirable.

The following figure shows this example more generally and/or formally in a flowchart.

Figure 7:
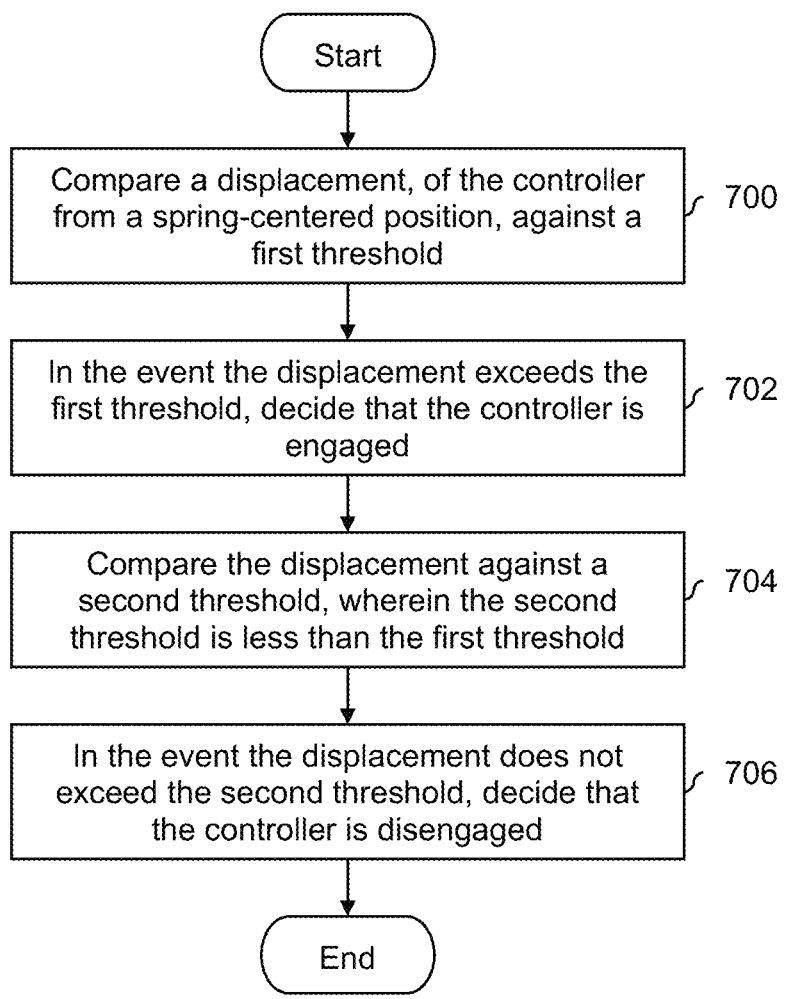
FIG. 7 is a flowchart illustrating an embodiment of a process to detect the state of an input device using hysteresis.

FIG. 7 is a flowchart illustrating an embodiment of a process to detect the state of an input device using hysteresis. In some embodiments, the process shown here supplements the process shown in FIG. 1 (e.g., performed before step 102 of FIG. 1 so that the output of FIG. 7 can be used during step 102 in FIG. 1). In the context of FIG. 2, the process of FIG. 7 shows how switch (208) may analyze the shaped input device signal in order to determine whether the input device is in the engaged state or the disengaged state. The process may be repeatedly and/or continuously performed in order to respond to or otherwise detect changes in the position of the input device.

At 700, a displacement, of the input device from a spring-centered position, is compared against a first threshold. For example, in the example of FIGS. 6A-6C, the input device is a joystick and the displacement is a radial displacement with respect to that spring center. Alternatively, an input device may be an input device with only a single axis or degree of freedom (e.g., a twist knob which can be twisted clockwise or counterclockwise or a thumbwheel which can be pushed up or down) and the displacement is with respect to the relevant spring-centered position.

At 702, in the event the displacement exceeds the first threshold, it is decided that the input device is engaged. See, for example, FIG. 6A and FIG. 6C (e.g., specifically the transition at $R_1$ (624) where the decision by the input device state detector goes from disengaged state 620 to engaged state 622).

At 704, the displacement is compared against a second threshold, wherein the second threshold is less than the first threshold. See, for example, FIGS. 6B and 6C where $R_2$ (an example of the second threshold) is less than $R_1$ (an example of the first threshold).

At 706, in the event the displacement does not exceed the second threshold, it is decided that the input device is disengaged. See, for example, FIG. 6B and FIG. 6C (e.g., specifically the transition at $R_2$ (626) where the decision by the input device state detector goes from engaged state 622 to disengaged state 620).

In some embodiments (e.g., in addition to or as an alternative to using hysteresis to detect the input device's state), the position-based supplemental attitude and velocity-based supplemental attitude are blended when switching from one to the other as the supplemental attitude. The following figures describe some examples of this.

Figure 8:
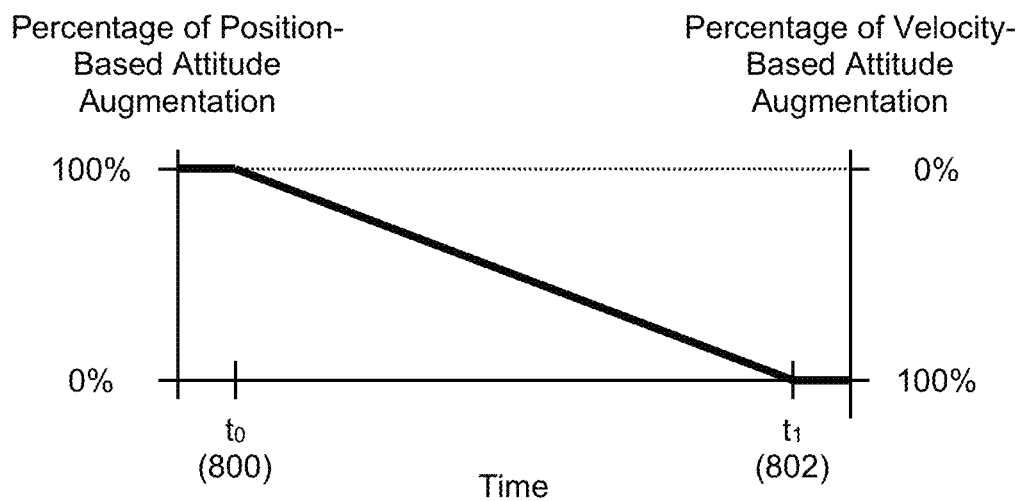
FIG. 8 is a diagram illustrating an embodiment of blending when the supplemental attitude switches from the position-based supplemental attitude to the velocity-based supplemental attitude.

FIG. 8 is a diagram illustrating an embodiment of blending when the supplemental attitude switches from the position-based supplemental attitude to the velocity-based supplemental attitude. In this example, the x-axis shows time and the y-axis shows the percentage of the supplemental attitude that comes from the position-based supplemental attitude and the velocity-based supplemental attitude. Before time $t_0$ (800), the supplemental attitude is made up 100% from the position-based supplemental attitude with 0% from the velocity-based supplemental attitude. Between times $t_0$ (800) and $t_1$ (802), the contribution from each source gradually changes so that the percentage of position-based supplemental attitude decreases while the percentage of velocity-based supplemental attitude increases. By time $t_1$ (802), the supplemental attitude is entirely composed of the velocity-based supplemental attitude.

With blending, there is no abrupt change in the supplemental attitude when switching between the two sources, which in turn ensures that the aircraft always responds smoothly. An abrupt change in the supplemental attitude (due to switching from one source to the other) could manifest itself in a jerky response, which is undesirable.

For brevity, the blending which corresponds to the other transition (e.g., when switching from the velocity-based supplemental attitude as the supplemental attitude to the position-based supplemental attitude) is not shown separately here. Conceptually, it would be the same as going backwards in time from time $t_1$ (802) to time $t_0$ (800) with the corresponding percentages of the two sources shown here.

The following figure shows this example more generally and/or formally in a flowchart.

Figure 9:
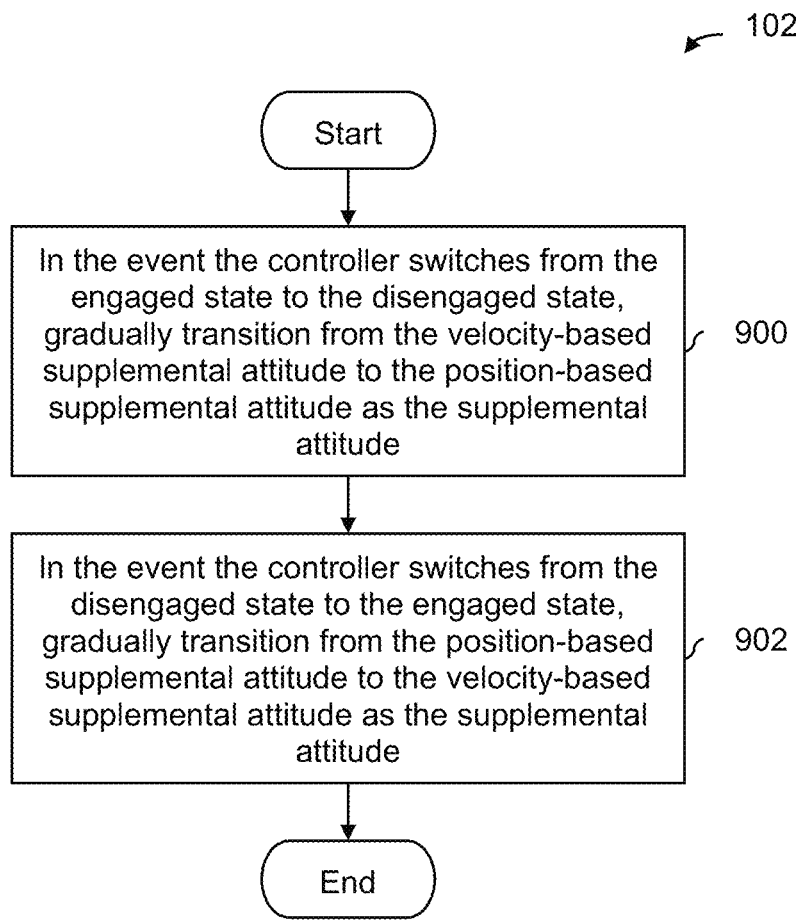
FIG. 9 is a flowchart illustrating an embodiment of a process to gradually switch between the position-based supplemental attitude and the velocity-based supplemental attitude when the input device changes states.

FIG. 9 is a flowchart illustrating an embodiment of a process to gradually switch between the position-based supplemental attitude and the velocity-based supplemental attitude when the input device changes states. In some embodiments, the process of FIG. 9 is performed during step 102 of FIG. 1. In the example system shown in FIG. 2, the process of FIG. 9 would be performed by switch 208.

At 900, in the event the input device switches from the engaged state to the disengaged state, there is a gradual transition from the velocity-based supplemental attitude to the position-based supplemental attitude as the supplemental attitude. For example, in FIG. 8, this corresponds to going from time $t_1$ (802) to time $t_0$ (800).

At 902, in the event the input device switches from the disengaged state to the engaged state, there is a gradual transition from the position-based supplemental attitude to the velocity-based supplemental attitude as the supplemental attitude. For example, in FIG. 9, this corresponds to going from time $t_0$ (800) to time $t_1$ (802).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled with the processor, wherein the memory is configured to provide the processor with instructions which when executed cause the processor to:
   receive an input attitude controlled by an input device of an aircraft;
   determine a state of the input device, wherein the state includes one of: engaged or disengaged;
   generate a supplemental attitude based at least in part on the state of the input device, including by:
   selecting a position-based supplemental attitude to be the supplemental attitude in the event the input device is in a disengaged state; and
   selecting a velocity-based supplemental attitude to be the supplemental attitude in the event the input device is in an engaged state;
   combine, using an adder, the input attitude and the supplemental attitude in order to obtain a combined attitude; and
   control the aircraft using the combined attitude including by instructing control surfaces of the aircraft to actuate.

2. The system recited in claim 1, wherein the memory is further configured to provide the processor with instructions which when executed cause the processor to:
   obtain a desired velocity which includes a desired direction of movement;
   obtain a measured velocity; and
   generate the velocity-based supplemental attitude, including by:
   determining a difference between the desired velocity and the measured velocity; and
   determining a portion of the difference that is perpendicular to the desired direction of movement.

3. The system recited in claim 1, wherein the memory is further configured to provide the processor with instructions which when executed cause the processor to:
   compare a displacement, of the input device from a spring-centered position, against a first threshold;
   in the event the displacement exceeds the first threshold, decide that the input device is engaged;
   compare the displacement against a second threshold, wherein the second threshold is less than the first threshold; and
   in the event the displacement does not exceed the second threshold, decide that the input device is disengaged.

4. The system recited in claim 3, wherein the input device includes a joystick and the displacement includes a radial displacement.

5. The system recited in claim 1, wherein the instructions for generating the supplemental attitude include instructions for:
in the event the input device switches from the engaged state to the disengaged state, gradually transition from the velocity-based supplemental attitude to the position-based supplemental attitude as the supplemental attitude; and
in the event the input device switches from the disengaged state to the engaged state, gradually transition from the position-based supplemental attitude to the velocity-based supplemental attitude as the supplemental attitude.

6. The system recited in claim 1, wherein:
the memory is further configured to provide the processor with instructions which when executed cause the processor to:
compare a displacement, of the input device from a spring-centered position, against a first threshold;
in the event the displacement exceeds the first threshold, decide that the input device is engaged;
compare the displacement against a second threshold, wherein the second threshold is less than the first threshold; and
in the event the displacement does not exceed the second threshold, decide that the input device is disengaged; and
the instructions for generating the supplemental attitude include instructions for:
in the event the input device switches from the engaged state to the disengaged state, gradually transition from the velocity-based supplemental attitude to the position-based supplemental attitude as the supplemental attitude; and
in the event the input device switches from the disengaged state to the engaged state, gradually transition from the position-based supplemental attitude to the velocity-based supplemental attitude as the supplemental attitude.

7. A system, comprising:
a processor; and
a memory coupled with the processor, wherein the memory is configured to provide the processor with instructions which when executed cause the processor to:
receive an input attitude controlled by an input device of an aircraft;
determine a state of the input device, wherein the state includes one of: engaged or disengaged;
generate a supplemental attitude based at least in part on the state of the input device, including by selecting a position-based supplemental attitude to be the supplemental attitude in the event the input device is in a disengaged state and selecting a velocity-based supplemental attitude to be the supplemental attitude in the event the input device is in an engaged state;
combine the input attitude and the supplemental attitude in order to obtain a combined attitude; and
control the aircraft using the combined attitude including by instructing control surfaces of the aircraft to actuate.

8. The system recited in claim 1, wherein the memory is further configured to provide the processor with instructions which when executed cause the processor to:
obtain a desired velocity which includes a desired direction of movement;
obtain a measured velocity; and
generate the velocity-based supplemental attitude, including by:
determining a difference between the desired velocity and the measured velocity; and
determining a portion of the difference that is perpendicular to the desired direction of movement.

9. The system recited in claim 1, wherein the memory is further configured to provide the processor with instructions which when executed cause the processor to:
compare a displacement, of the input device from a spring-centered position, against a first threshold;
in the event the displacement exceeds the first threshold, decide that the input device is engaged;
compare the displacement against a second threshold, wherein the second threshold is less than the first threshold; and
in the event the displacement does not exceed the second threshold, decide that the input device is disengaged.

10. The system recited in claim 9, wherein the input device includes a joystick and the displacement includes a radial displacement.

11. The system recited in claim 7, wherein the instructions for generating the supplemental attitude include instructions for:
in the event the input device switches from the engaged state to the disengaged state, gradually transition from the velocity-based supplemental attitude to the position-based supplemental attitude as the supplemental attitude; and
in the event the input device switches from the disengaged state to the engaged state, gradually transition from the position-based supplemental attitude to the velocity-based supplemental attitude as the supplemental attitude.

12. The system recited in claim 7, wherein:
the memory is further configured to provide the processor with instructions which when executed cause the processor to:
compare a displacement, of the input device from a spring-centered position, against a first threshold;
in the event the displacement exceeds the first threshold, decide that the input device is engaged;
compare the displacement against a second threshold, wherein the second threshold is less than the first threshold; and
in the event the displacement does not exceed the second threshold, decide that the input device is disengaged; and
the instructions for generating the supplemental attitude include instructions for:
in the event the input device switches from the engaged state to the disengaged state, gradually transition from the velocity-based supplemental attitude to the position-based supplemental attitude as the supplemental attitude; and
in the event the input device switches from the disengaged state to the engaged state, gradually transition from the position-based supplemental attitude to the velocity-based supplemental attitude as the supplemental attitude.

13. A method, comprising:
receiving an input attitude controlled by an input device of an aircraft;

determining a state of the input device, wherein the state includes one of: engaged or disengaged;

generating a supplemental attitude based at least in part on the state of the input device, including by:

selecting a position-based supplemental attitude to be the supplemental attitude in the event the input device is in a disengaged state; and selecting a velocity-based supplemental attitude to be the supplemental attitude in the event the input device is in an engaged state;

combining the input attitude and the supplemental attitude in order to obtain a combined attitude; and controlling the aircraft using the combined attitude including by instructing control surfaces of the aircraft to actuate.

14. The method recited in claim 13 further comprising:

obtaining a desired velocity which includes a desired direction of movement;

obtaining a measured velocity; and generating the velocity-based supplemental attitude, including by:

determining a difference between the desired velocity and the measured velocity; and determining a portion of the difference that is perpendicular to the desired direction of movement.

15. The method recited in claim 13 further comprising:

comparing a displacement, of the input device from a spring-centered position, against a first threshold;

in the event the displacement exceeds the first threshold, deciding that the input device is engaged;

comparing the displacement against a second threshold, wherein the second threshold is less than the first threshold; and in the event the displacement does not exceed the second threshold, deciding that the input device is disengaged.

16. The method recited in claim 15, wherein the input device includes a joystick and the displacement includes a radial displacement.

17. The method recited in claim 13, wherein generating the supplemental attitude includes:

in the event the input device switches from the engaged state to the disengaged state, gradually transitioning from the velocity-based supplemental attitude to the position-based supplemental attitude as the supplemental attitude; and in the event the input device switches from the disengaged state to the engaged state, gradually transitioning from the position-based supplemental attitude to the velocity-based supplemental attitude as the supplemental attitude.

18. The method recited in claim 13, wherein:

the method further includes:

comparing a displacement, of the input device from a spring-centered position, against a first threshold;

in the event the displacement exceeds the first threshold, deciding that the input device is engaged;

comparing the displacement against a second threshold, wherein the second threshold is less than the first threshold; and in the event the displacement does not exceed the second threshold, deciding that the input device is disengaged; and generating the supplemental attitude includes:

in the event the input device switches from the engaged state to the disengaged state, gradually transitioning from the velocity-based supplemental attitude to the position-based supplemental attitude as the supplemental attitude; and in the event the input device switches from the disengaged state to the engaged state, gradually transitioning from the position-based supplemental attitude to the velocity-based supplemental attitude as the supplemental attitude.

19. A computer program product, the computer program product being embodied in a non-transitory computer readable storage medium and comprising computer instructions for:

receiving an input attitude controlled by an input device of an aircraft;

determining a state of the input device, wherein the state includes one of: engaged or disengaged;

generating a supplemental attitude based at least in part on the state of the input device, including by:

selecting a position-based supplemental attitude to be the supplemental attitude in the event the input device is in a disengaged state; and selecting a velocity-based supplemental attitude to be the supplemental attitude in the event the input device is in an engaged state;

combining the input attitude and the supplemental attitude in order to obtain a combined attitude; and controlling the aircraft using the combined attitude including by instructing control surfaces of the aircraft to actuate.

* * * * *